United States Patent
Ichinowatari et al.

(10) Patent No.: US 9,128,600 B2
(45) Date of Patent: Sep. 8, 2015

(54) DISPLAY CONTROL APPARATUS AND METHOD, IMAGE DISPLAY APPARATUS, AND NON-TRANSITORY COMPUTER READABLE MEDIUM

(71) Applicant: FUJI XEROX CO., LTD., Minato-ku, Tokyo (JP)

(72) Inventors: Yasushi Ichinowatari, Kanagawa (JP); Yu Mishima, Kanagawa (JP); Tomohito Takagi, Kanagawa (JP); Yuzo Aoshima, Tokyo (JP); Yuki Okabe, Tokyo (JP); Chinatsu Hisamoto, Tokyo (JP)

(73) Assignee: FUJI XEROX CO., LTD., Tokyo (JP)

( * ) Notice: Subject to any disclaimer, the term of this patent is extended or adjusted under 35 U.S.C. 154(b) by 104 days.

(21) Appl. No.: 13/859,436

(22) Filed: Apr. 9, 2013

(65) Prior Publication Data

US 2014/0092038 A1    Apr. 3, 2014

(30) Foreign Application Priority Data

Sep. 28, 2012 (JP) ................. 2012-218671

(51) Int. Cl.
  *G06F 3/0488*   (2013.01)
  *G06F 3/0484*   (2013.01)
  *G06F 3/0486*   (2013.01)
  *G06F 3/044*    (2006.01)

(52) U.S. Cl.
  CPC ............ *G06F 3/0488* (2013.01); *G06F 3/0486* (2013.01); *G06F 3/04845* (2013.01); *G06F 3/04886* (2013.01); *G06F 3/044* (2013.01)

(58) Field of Classification Search
  CPC ... G06F 3/04883; G06F 3/017; G06F 3/0481; G06F 3/0488; G06F 2203/04807; G06F 3/0485; G09G 5/34
  USPC .......... 345/619, 650, 661; 715/835, 863, 788, 715/800
  See application file for complete search history.

(56) References Cited

U.S. PATENT DOCUMENTS

| | | | |
|---|---|---|---|
| 2008/0123123 A1 | 5/2008 | Kawaharada | |
| 2010/0088641 A1* | 4/2010 | Choi | 715/828 |
| 2011/0164063 A1* | 7/2011 | Shimotani et al. | 345/661 |

FOREIGN PATENT DOCUMENTS

| | | |
|---|---|---|
| JP | 2008-027243 A | 2/2008 |
| JP | 2009-003579 A | 1/2009 |
| JP | 2009-282327 A | 12/2009 |

* cited by examiner

*Primary Examiner* — MD Saiful A Siddiqui
(74) *Attorney, Agent, or Firm* — Sughrue Mion, PLLC

(57) ABSTRACT

A display control apparatus includes a controller. While a plurality of images is displayed on a display including a display region with a surface on which a touch panel is provided, in response to an approaching operation, performed via the touch panel, of specifying at least one image and causing at least two of the plurality of images to come closer to each other, the controller superimposes and displays approaching images, for which the approaching operation is performed, over each other.

7 Claims, 15 Drawing Sheets

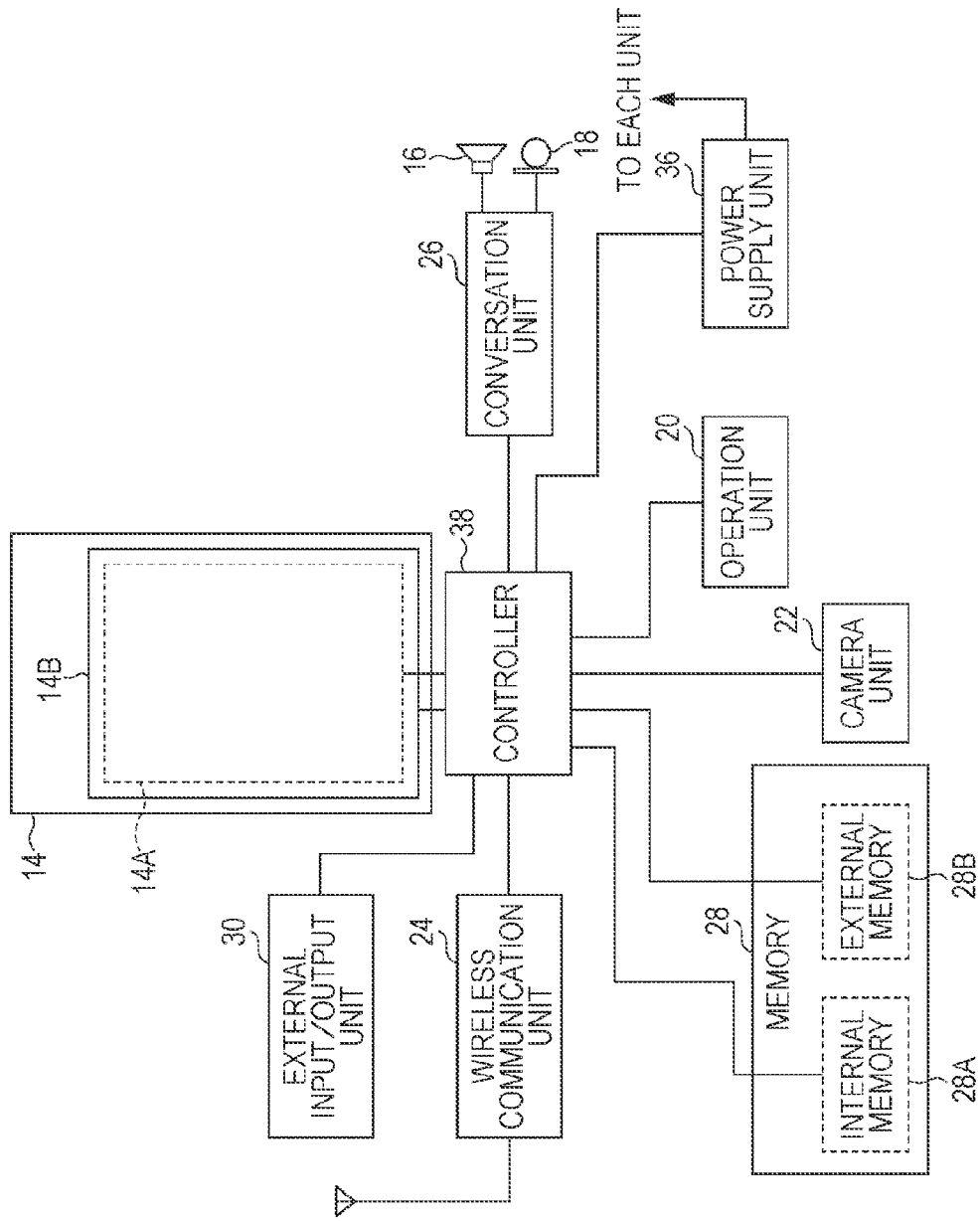

FIG. 3A

| ORDER OF SEQUENCE | FILE NAME | PHOTOGRAPHER | SUPERIMPOSED STATE |
|---|---|---|---|
| 1 | A1 | A | NOT SUPERIMPOSED |
| 2 | A2 | A | NOT SUPERIMPOSED |
| ... | ... | ... | ... |
| M | AM | A | NOT SUPERIMPOSED |
| 1 | B1 | B | NOT SUPERIMPOSED |
| 2 | B2 | B | NOT SUPERIMPOSED |
| ... | ... | ... | ... |
| N | BN | B | NOT SUPERIMPOSED |
| N+1 | BN+1 | B | NOT SUPERIMPOSED |
| N+2 | BN+2 | B | NOT SUPERIMPOSED |
| ... | ... | ... | ... |

FIG. 3B

| ORDER OF SEQUENCE | FILE NAME | PHOTOGRAPHER | SUPERIMPOSED STATE |
|---|---|---|---|
| 1 | A1 | A | NOT SUPERIMPOSED |
| 2 | A2 | A | NOT SUPERIMPOSED |
| ... | ... | ... | ... |
| M | AM | A | NOT SUPERIMPOSED |
| 1 | B1 | B | GROUP E |
| 2 | B2 | B | GROUP E |
| ... | ... | ... | ... |
| N | BN | B | GROUP E |
| N+1 | BN+1 | B | NOT SUPERIMPOSED |
| N+2 | BN+2 | B | NOT SUPERIMPOSED |
| ... | ... | ... | ... |

DISPLAY CONTROL APPARATUS AND METHOD, IMAGE DISPLAY APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-218671 filed Sep. 28, 2012.

BACKGROUND

Technical Field

The present invention relates to a display control apparatus and method, an image display apparatus, and a non-transitory computer readable medium.

SUMMARY

According to an aspect of the invention, there is provided a display control apparatus including a controller. While multiple images is displayed on a display including a display region with a surface on which a touch panel is provided, in response to an approaching operation, performed via the touch panel, of specifying at least one image and causing at least two of the multiple images to come closer to each other, the controller superimposes and displays approaching images, for which the approaching operation is performed, over each other.

BRIEF DESCRIPTION OF THE DRAWINGS

Exemplary embodiments of the present invention will be described in detail based on the following figures, wherein:

FIG. 2 is a block diagram illustrating the configuration of the smartphone according to the exemplary embodiments;

FIG. 3A is a schematic diagram illustrating an exemplary configuration of file information according to the exemplary embodiments;

FIG. 3B is a schematic diagram illustrating an exemplary configuration of the file information according to the exemplary embodiments;

DETAILED DESCRIPTION

Hereinafter, exemplary embodiments of the invention will be described in detail with reference to the drawings. Note that, in the following first to sixth exemplary embodiments, the case in which the exemplary embodiments are applied to a smartphone will be described by way of example. However, the exemplary embodiments are not limited to this case, and the exemplary embodiments are applicable to other devices with touch panel displays, such as other mobile phones, personal digital assistants (PDAs), and portable game machines.

The smartphone according to the exemplary embodiments presents multiple menu items to a user to prompt the user to select a desired menu item, thereby activating an application program or software corresponding to the selected menu item. However, the smartphone according to the exemplary embodiments is not limited to such a smartphone. That is, the smartphone according to the exemplary embodiments may activate, in response to an instruction to activate an application program or software, a list displaying function, which will be described later, on the basis of the application program or software given in the instruction. Alternatively, the smartphone according to the exemplary embodiments may activate a list displaying function, which will be described later, by using an application program or software activated by a web browsing function in response to specification of a uniform resource locator (URL).

First Exemplary Embodiment

Figure 1:
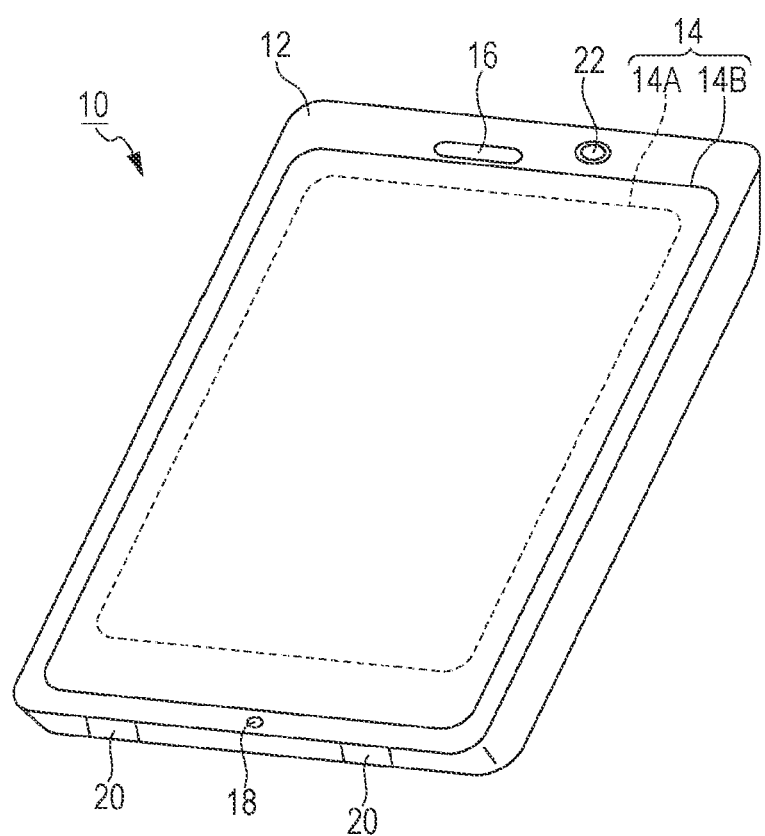
FIG. 1 is a perspective view illustrating the external appearance of a smartphone according to exemplary embodiments.

As illustrated in FIG. 1, a smartphone 10 according to a first exemplary embodiment includes a plate-shaped housing 12. On one of the faces of the housing 12, the smartphone 10 includes a display input unit 14 including a display panel 14A serving as a display and an operation panel 14B configured as a touch panel, which are integrated with each other. The housing 12 further includes a loudspeaker 16, a microphone 18, an operation unit 20, and a camera unit 22. Note that the shape of the housing 12 is not limited to the plate shape, and the housing 12 may adopt a configuration including, for example, a folding structure or a sliding structure.

As illustrated in FIG. 2, the smartphone 10 includes, as major elements, the display input unit 14, the operation unit 20, and the camera unit 22, which are described above, and a wireless communication unit 24, a conversation unit 26, a memory 28, an external input/output unit 30, a power supply unit 36, and a controller 38. Note that the smartphone 10 has, as a main function, a wireless communication function of performing mobile wireless communication with a base station device via a mobile communication network.

The wireless communication unit 24 is configured to perform wireless communication with the base station device contained in the mobile communication network in response to an instruction from the controller 38. Using wireless communication, the wireless communication unit 24 transmits and receives various types of file data including audio data and image data, e-mail data, or the like to and from an external device, and receives web data, streaming data, or the like from an external device.

The display input unit 14 is a so-called touch panel display, under control of the controller 38, which visually communicates information to a user by displaying images (still images and moving images), character information, or the like, and detects a user operation performed in response to the displayed information.

As described above, the display input unit 14 according to the first exemplary embodiment includes the display panel 14A and the operation panel 14B.

Here, the display panel 14A uses a liquid crystal display (LCD), an organic electro-luminescence display (OELD), or the like as a display device. The operation panel 14B is a device that is stacked on the display panel 14A so that an image displayed on a display face of the display panel 14A is visually recognizable and that detects one or multiple coordinates operated by a finger of a user or a touch pen. In response to operating the device by using a finger of a user or a touch pen, the device outputs a detection signal generated in response to the operation to the controller 38. Next, on the basis of the received detection signal, the controller 38 detects the operated position (coordinates) on the display panel 14A.

Although the size of a display region of the display panel 14A may completely coincide with the size of the display panel 14A, the two sizes may not necessarily coincide with each other. A position detecting method adopted by the operation panel 14B includes a matrix switch method, a resistive film method, a surface acoustic wave method, an infrared method, an electromagnetic induction method, an electrostatic capacitance method, or the like, any of which is adoptable.

The conversation unit 26 includes the loudspeaker 16 and the microphone 18, which are described above. The conversation unit 26 converts the voice of a user input through the microphone 18 into audio data that may be processed by the controller 38, and outputs the audio data to the controller 38. The conversation unit 26 also decodes audio data received by the wireless communication unit 24 or the external input/output unit 30, and outputs sound, which is the decoded audio data, from the loudspeaker 16. As illustrated in FIG. 1, for example, the loudspeaker 16 is mounted on the same face as that on which the display input unit 14 is provided, and the microphone 18 is mounted on the front face of the housing 12.

The operation unit 20 accepts an instruction from a user. For example, as illustrated in FIG. 1, the operation unit 20 is mounted on a lateral face of the housing 12 of the smartphone 10. The operation unit 20 is a push-button switch that is turned on when pressed with a finger or the like, and that enters an off state due to the resilience of a spring or the like when the finger is released from the switch.

The memory 28 stores a control program executed by the controller 38, control data, application software, address data that corresponds the name of a communication partner with a telephone number or the like, and transmitted and received e-mail data. The memory 28 also stores web data downloaded by web browsing, and downloaded content data. Further, the memory 28 temporarily stores streaming data or the like.

Here, the memory 28 according to the first exemplary embodiment includes an internal memory 28A included in the smartphone 10 and an external memory 28B with an external memory slot detachably attached to the smartphone 10. The internal memory 28A and the external memory 28B configuring the memory 28 are realized using flash memory type storage media or the like. Alternatively, the storage media may be hard disk type, multimedia card micro type, or card type memories (such as microSD (registered trademark)

memories). Alternatively, the memories may be storage media such as random-access memories (RAMs) or read-only memories (ROMs).

The external input/output unit 30 plays the role of an interface with an external device connected to the smartphone 10. The external input/output unit 30 according to the first exemplary embodiment directly or indirectly connects to another external device in accordance with a predetermined communication standard or the like. The communication standard or the like is, for example, Universal Serial Bus (USB), Institute of Electrical and Electronic Engineers (IEEE) 1394, or the like, or a network (such as the Internet, a wireless local area network (LAN), or Bluetooth (registered trademark)). Alternatively, the communication standard or the like may be radio frequency identification (RFID) or Infrared Data Association (IrDA) (registered trademark). Further, the communication standard or the like may be ultra-wideband (UWB) (registered trademark) or Zigbee (registered trademark).

Here, the external device connected to the smartphone 10 according to the first exemplary embodiment is, for example, a wired/wireless headset, a wired/wireless external charger, a wired/wireless data port, a memory card connected via a card socket, or the like. The external device may be a subscriber identity module (SIM) card, a user identity module (UIM) card, or an external audio-video device connected via an audio-video input/output (I/O) terminal. Alternatively, the external device may be a wirelessly connected external audio-video device, a wired/wirelessly connected smartphone, a wired/wirelessly connected personal computer, a wired/wirelessly connected PDA, or an earphone. The external input/output unit 30 according to the first exemplary embodiment communicates data transmitted from these external devices to the elements included in the smartphone 10, and transmits data in the smartphone 10 to the external devices.

The power supply unit 36 is configured to supply electric power accumulated in a battery (not illustrated) to the units of the smartphone 10 in response to an instruction from the controller 38.

Further, the controller 38 includes a microprocessor. The controller 38 is configured to operate in accordance with a control program and control data stored in the memory 28, and collectively controls the units of the smartphone 10. In order to perform audio communication or data communication via the wireless communication unit 24, the controller 38 also has a mobile communication controlling function of controlling the units of a communication system, and an application processing function.

Here, the application processing function is realized by the controller 38 operating in accordance with application software stored in the memory 28. The application processing function includes, for example, an infrared communication function of controlling the external input/output unit 30 and performing data communication with a device facing the smartphone 10, an e-mail function of transmitting and receiving e-mail, and a web browsing function of browsing web pages.

Also, the controller 38 has an image processing function of displaying video on the display input unit 14 on the basis of image data (still image and moving image data) such as received data or downloaded streaming data. Note that the image processing function described here is the function of the controller 38 decoding the image data, applying image processing to the decoded image data, and displaying an image on the display input unit 14.

Further, the controller 38 executes display control of various types of information on the display panel 14A, and operation detection control that detects a user operation performed via the operation unit 20, the operation panel 14B, or the like.

By executing the above-described display control, the controller 38 displays an operation unit represented in software, such as an icon for activating application software or a scroll bar, or a window for writing e-mail. Note that the scroll bar described here is an operation unit represented in software for accepting an instruction to move a display part of an image that is too large to fit into the display region of the display panel 14A.

By executing the above-described operation detection control, the controller 38 detects a user operation performed via the operation unit 20, or accepts an operation performed on the icon via the operation panel 14B, or a character string entered in an entry column of the window.

Further, the controller 38 detects a gesture operation performed on the operation panel 14B, and executes a preset function in accordance with the detected gesture operation. Note that the gesture operation described here is not a conventional simple touch operation, but an operation that renders a track with a finger or the like, that simultaneously specifies multiple positions, or, by combining these operations, that renders a track for at least one of multiple positions.

The camera unit 22 is a digital camera that captures an image using an imaging element such as a complementary metal oxide semiconductor (CMOS) or a charge-coupled device (CCD). Under control of the controller 38, the camera unit 22 converts image data, obtained by capturing an image, to image data compressed in accordance with a predetermined standard such as the Joint Photographic Experts Group (JPEG). The camera unit 22 also records the converted image data in the memory 28, or outputs the image data to an external device via the external input/output unit 30, the wireless communication unit 24, or the like. In the smartphone 10 illustrated in FIG. 1, the camera unit 22 is mounted on the same face as that on which the display input unit 14 is mounted. However, the position at which the camera unit 22 is mounted is not limited to this position. The camera unit 22 may be mounted on the back of the display input unit 14, or multiple camera units 22 may be mounted. When multiple camera units 22 are mounted, the camera unit 22 to be used to capture an image is switched from one to another and the single camera unit 22 is used to capture an image, or multiple camera units 22 are simultaneously used to capture images.

Here, the camera unit 22 according to the first exemplary embodiment is used for various functions of the smartphone 10. For example, an image obtained with the camera unit 22 is displayed on the display panel 14A, or an image obtained with the camera unit 22 is used as an operation input on the operation panel 14B.

Further, the camera unit 22 adds audio information obtained by the microphone 18 (which may be converted by the controller 38 or the like from audio to text information) or the like to still image or moving image data. The camera unit 22 records the image data with the audio information added thereto in the memory 28, or outputs the image data with the audio information added thereto to an external device via the external input/output unit 30 or the wireless communication unit 24.

By the way, when image data is stored in at least one of the internal memory 28A and the external memory 28B and an instruction to display a list of pieces of image data is given in response to a user operation, the smartphone 10 according to the first exemplary embodiment controls the display panel 14A to display the list. In the first exemplary embodiment, image data obtained by capturing an image with an image capturing unit such as the camera unit 22 is applied as the above-described image data.

The smartphone 10 has a superimposed display function of superimposing and displaying multiple images over one another in response to a predetermined user operation performed via the operation panel 14B on images displayed in the list.

Therefore, the smartphone 10 according to the first exemplary embodiment stores, in the memory 28, file information for managing the order of sequence and the superimposed state of electronic files including the above-described image data (hereinafter may also be simply referred to as "files") when the files are displayed in a list.

For example, as illustrated in FIG. 3A, file information 40 according to the first exemplary embodiment is information in which, for each file, order-of-sequence information indicating the order of sequence, file name information indicating the file name, photographer information indicating the photographer, and superimposed state information indicating the superimposed state are associated with one another. As illustrated in FIG. 3A, in the first exemplary embodiment, as the superimposed state information, when no corresponding image is superimposed, information indicating "not superimposed" is stored; when a corresponding image is superimposed, information indicating the group name of a group of images superimposed over one another is stored.

On the basis of the file information 40, the smartphone 10 according to the first exemplary embodiment displays files included in the same group as a slide show, or displays a list of files on a group by group basis.

While displaying a list, the smartphone 10 according to the first exemplary embodiment updates the file information 40 when multiple images are superimposed and displayed over one another, or when superimposed display is cancelled by using the superimposed display function. That is, when, for example, images of files B1 to BN are superimposed over one another and displayed as group E, as illustrated in FIG. 3B by way of example, the smartphone 10 changes the superimposed state information regarding the images of files B1 to BN from "not superimposed" to "group E".

The smartphone 10 according to the first exemplary embodiment displays a list of images indicated by the above-described image data. However, the smartphone 10 is not limited to this example. Alternatively, a list of images of icons representing document files, audio files, application programs, or the like stored in the memory 28 may be displayed.

Figure 4:
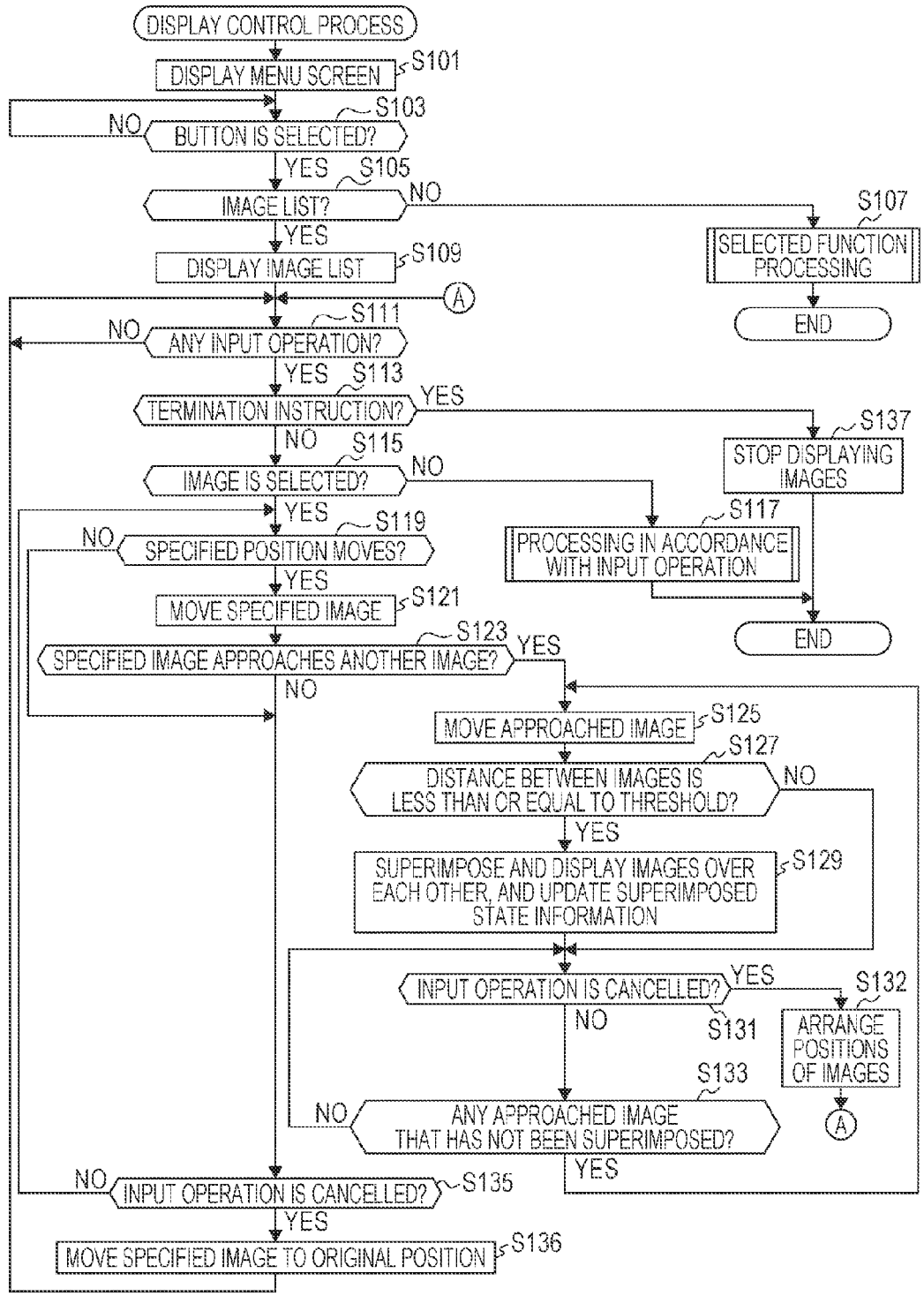
FIG. 4 is a flowchart illustrating the flow of a process of a display control processing program according to a first exemplary embodiment.

Next, referring to FIG. 4, the operation of the smartphone 10 according to the first exemplary embodiment will be described. FIG. 4 is a flowchart illustrating the flow of a process of a display control processing program executed by the controller 38 of the smartphone 10 in response to an execution instruction input via the operation panel 14B or the operation unit 20. This program is stored in advance in a predetermined region of the internal memory 28A.

In step S101 of FIG. 3, the controller 38 performs control to display a menu screen serving as a start point of a screen transition on the display panel 14A.

Figure 5:
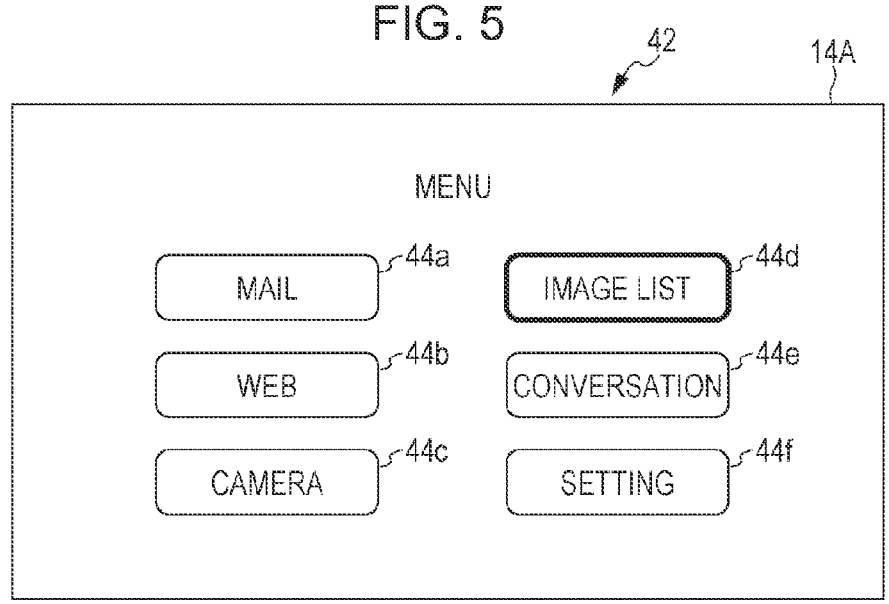
FIG. 5 is a front view illustrating an exemplary configuration of a menu screen according to the first exemplary embodiment.

As illustrated in FIG. 5, a menu screen 42 according to the first exemplary embodiment includes a mail button 44a for accepting an instruction to activate a mail function, and a web button 44b for accepting an instruction to activate a web browsing function. The menu screen 42 also includes a camera button 44c for accepting an instruction to activate a camera function, and an image list button 44d for accepting an instruction to activate the above-described list displaying function. The menu screen 42 also includes menu buttons such as a conversation button 44e for accepting an instruction to activate a conversation function, and a setting button 44f for accepting an instruction to activate various setting functions.

On the menu screen 42, a user selects one of menu items by touching the top of a menu button corresponding to a function to be activated. In response to this, the controller 38 activates the function corresponding to the selected menu button.

In step S103, the process waits for the user to select one of the menu buttons. In step S105, it is determined whether the menu button selected by the user is the image list button 44d. When the determination in step S105 is negative, the process proceeds to step S107, executes a function corresponding to the selected menu button, and terminates the display control processing program. In contrast, when the determination in step S105 is affirmative, the process proceeds to step S109.

In step S109, the controller 38 performs control to display, on the display panel 14A, an image list screen displaying a list of images indicated by files stored in the memory 28.

Figure 6:
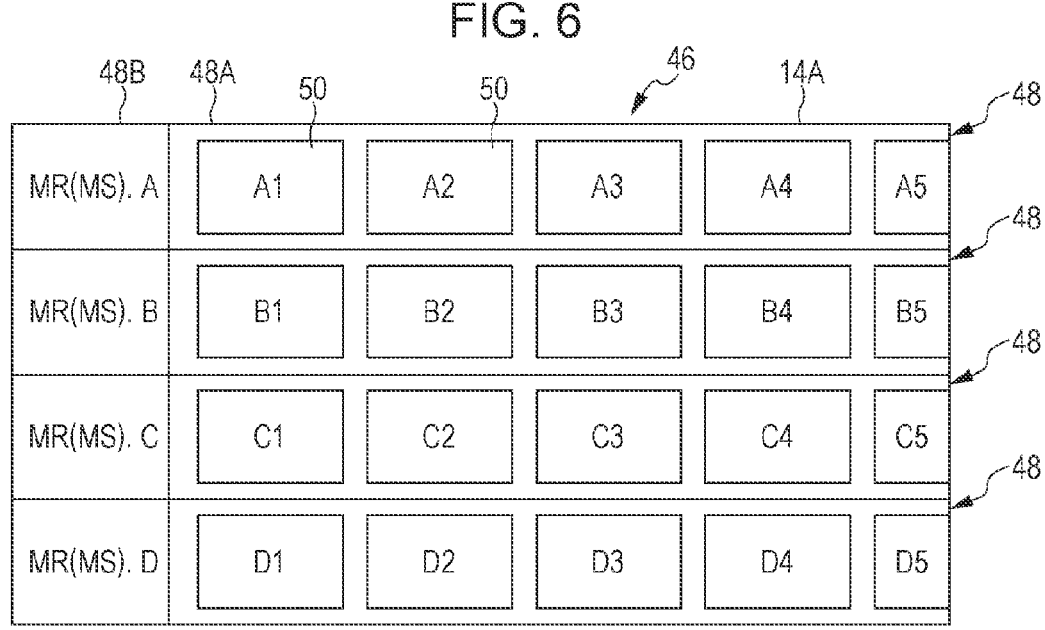
FIG. 6 is a front view illustrating an exemplary configuration of an image list screen according to the first exemplary embodiment.

As illustrated in FIG. 6, an image list screen 46 according to the first exemplary embodiment is the display region of the display panel 14A, which is divided into multiple divided regions 48 divided in a predetermined direction (the vertical direction in front view in FIG. 6 in the first exemplary embodiment). The divided regions 48 are further divided into image display regions 48A displaying images 50 and attribute display regions 48B displaying attributes corresponding to the images 50 displayed in the image display regions 48A.

The images 50 displayed in the list are allocated to the divided regions 48 according to predetermined attributes and are displayed in the divided regions 48. In the first exemplary embodiment, the photographers of corresponding images 50 are applied as the attributes, and the images 50 are allocated to the divided regions 48 according to the photographers (A to D in the example illustrated in FIG. 6). Also, the images 50 allocated according to the attributes are arranged in a direction intersecting the above-described predetermined direction (the horizontal direction in front view in FIG. 6 in the first exemplary embodiment; hereinafter may also be referred to as the "arrangement direction") and displayed in the divided regions 48. At this time, the images 50 are displayed in the image display regions 48A in an order indicated by the order-of-sequence information in the arrangement direction.

In step S111, the controller 38 enters standby until an input operation is performed on one of the operation panel 14B and the operation unit 20. In step S113, it is determined whether the input operation is an input operation of giving an instruction to terminate the display control processing program. In the smartphone 10 according to the first exemplary embodiment, when the operation unit 20 positioned on the left side in front view of the smartphone 10 is pressed, processing being executed at that time is terminated.

When the determination in step S113 is negative, the process proceeds to step S115, and it is determined whether the input operation is an input operation of selecting an image. At this time, the controller 38 determines that the input operation is an input operation of selecting an image when any of the images 50 is specified via the operation panel 14B. When the determination in step S115 is negative, the process proceeds to step S117, processing in accordance with the input operation is performed, and the display control processing program is terminated.

In contrast, when the determination in step S115 is affirmative, the process proceeds to step S119, and it is determined whether a position specified by the user at this point of time on the operation panel 14B (hereinafter may also be referred to as a "specified position") moves. At this time, the controller 38 determines that the specified position moves when the specified position moves by a predetermined distance (such as 3 mm) or more from the specified position detected in the processing in step S111.

When the determination in step S119 is negative, the process proceeds to step S135. In contrast, when the determination in step S119 is affirmative, the process proceeds to step S121, and the controller 38 performs control to move an image displayed at the specified position (hereinafter may also be referred to as a "specified image") in accordance with the amount of movement of the specified position.

Figure 7A:
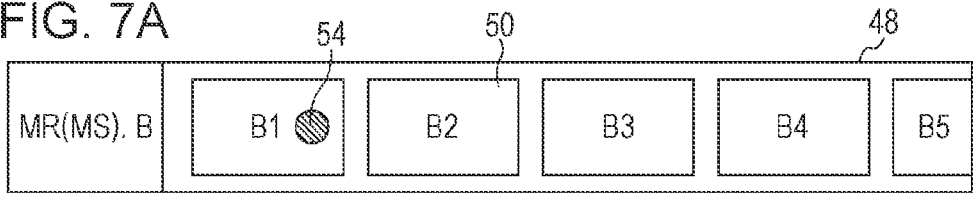
FIG. 7A is a front view illustrating an exemplary configuration of a major portion of the image list screen according to the first exemplary embodiment.

For example, as illustrated in FIG. 7A, it is assumed that the user specifies a position (specified position 54) in the display region of image B1, and the specified position 54 moves in a direction in which image B2 is displayed. In this case, the controller 38 moves the display position of image B1 in accordance with the movement of the specified position 54. Note that, in the first exemplary embodiment, the display position of image B1 is moved in the arrangement direction in accordance with the amount of movement of the specified position 54 in the arrangement direction.

In step S123, it is determined whether the specified image approaches another image (another image included in the same divided region 48 in the first exemplary embodiment). At this time, the controller 38 determines that the specified image approaches another image (hereinafter may also be referred to as an "approached image") when the distance between the specified image and the approached image becomes shorter by a predetermined distance (such as 3 mm) or more in response to the movement of the specified image in step S121.

When the determination in step S123 is affirmative, the process proceeds to step S125, and the approached image is moved by a predetermined distance (such as 3 mm) in a direction toward the specified image. At this time, when there are multiple approached images, the approached images are individually moved along with one another by the predetermined distance.

That is, the user specifies an image displayed on the operation panel 14B, and performs an approaching operation of causing this image to approach another image, thereby giving an instruction to superimpose and display these images over each other. In response to detection of the fact that the approaching operation is performed by the processing in step S123, the controller 38 performs control to move and gather the images to one place by performing processing in step S125, and to superimpose and display the images over each other. In the first exemplary embodiment, an operation of reducing the distance between at least two images among multiple images displayed on the display panel 14A is referred to as an approaching operation. Also, in the first exemplary embodiment, the specified image and an approached image for which an operation to reduce the distance therebetween are collectively referred to as "approaching images".

Figure 7B:
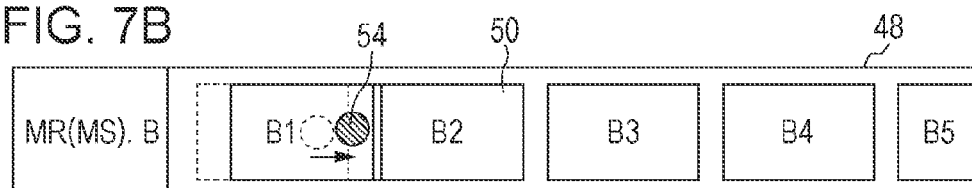
FIG. 7B is a front view illustrating an exemplary configuration of the major portion of the image list screen according to the first exemplary embodiment.
Figure 7C:
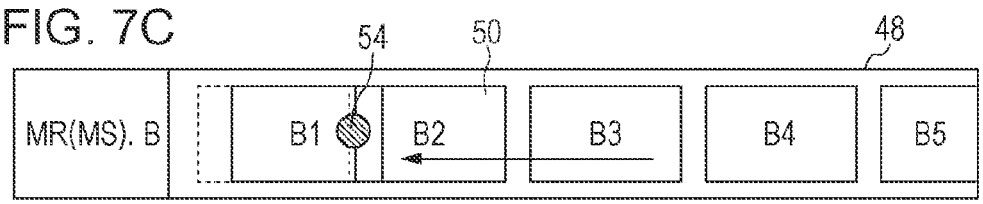
FIG. 7C is a front view illustrating an exemplary configuration of the major portion of the image list screen according to the first exemplary embodiment.

For example, as illustrated in FIG. 7B, when the controller 38 causes image B1 to approach images B2 to B5, as illustrated in FIG. 7C, the controller 38 moves images B2 to B5 . . . along with one another in a direction toward image B1 (a direction contrary to the arrangement direction in the first exemplary embodiment).

In step S127, it is determined whether the distance between the images, which have been caused to approach each other in step S125, becomes a predetermined threshold or less. The threshold is a predetermined threshold for determining that the specified image and the approached image are superimposed and displayed over each other. Information indicating the threshold is stored in advance in the internal memory 28A.

When the determination in step S127 is negative, the process proceeds to step S131. In contrast, when the determination in step S127 is affirmative, the process proceeds to step S129, and the controller 38 performs control to superimpose the approached image, whose distance with the specified image has been determined by the processing in step S127 to be the threshold or less, over the specified image and to display these images as an image bundle. In step S129, the controller 38 updates the superimposed state information so that the specified image and the approached image belong to the same group.

Figure 7D:
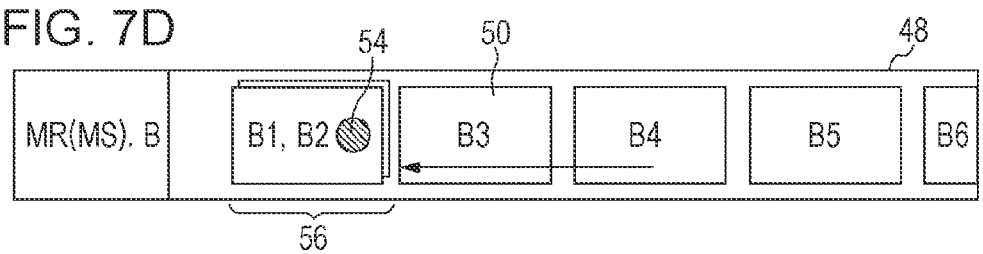
FIG. 7D is a front view illustrating an exemplary configuration of the major portion of the image list screen according to the first exemplary embodiment.

For example, as illustrated in FIG. 7D, the controller 38 moves image B2 in a direction toward image B1, and, when the distance between image B1 and image B2 becomes the threshold or less, the controller 38 performs control to superimpose images B1 and B2 over each other and to display images B1 and B2 as an image bundle 56. At this time, either image B1 or B2 may be displayed on top of the other. However, when image B1, which is the specified image, is displayed on top of image B2, it becomes clear for the user to recognize the specified image, which is thus preferable. Images B1 and B2 may be completely superimposed over each other and displayed, or images B1 and B2 may be superimposed, but slightly offset, over each other and displayed, which enables the user to recognize that multiple images are superimposed over one another.

In the example illustrated in FIGS. 7A to 7E, for example, as illustrated in FIG. 3B, the controller 38 updates the superimposed state information so that images B1 and B2 belong to the same group, namely, group E, in the file information 40.

In step S131, it is determined whether touching of the operation panel 14B by the user is released, thereby determining whether the input operation detected in step S111 is cancelled. When the determination in step S131 is affirmative, the process proceeds to step S132, the controller 38 arranges the positions of the images 50 displayed on the display panel 14A, and the process returns to step S111. When arranging the positions of the images 50, the controller 38 performs control to display the images 50 at positions at which the images 50 are equidistant, without changing the order of sequence of the images 50 including, for example, the image bundle 56.

Figure 7E:
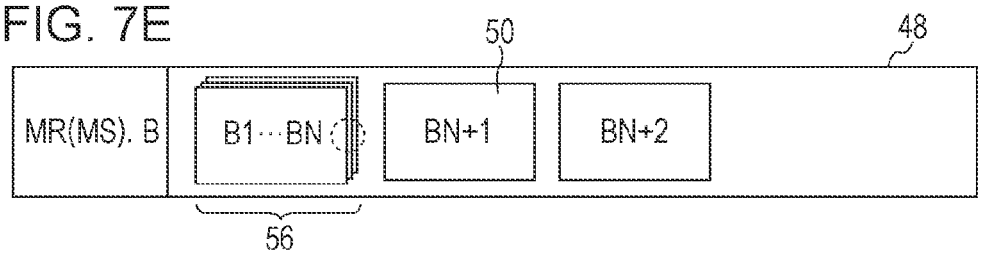
FIG. 7E is a front view illustrating an exemplary configuration of the major portion of the image list screen according to the first exemplary embodiment.

For example, as illustrated in FIG. 7E, it is assumed that the input operation is cancelled at a point at which images B2 to BN are superimposed and displayed over image B1. In this case, the controller 38 performs control to superimpose and display images B2 to BN over image B1. For image BN+1 and image BN+2 that are displayed but are not superimposed over image B1 at the time the input operation is cancelled, the controller 38 performs control to display image BN+1 and image BN+2 as they are, without superimposing image BN+1 and image BN+2 over image B1. At this time, the controller 38 displays the image bundle 56, which includes images B2 to BN superimposed over image B1, image BN+1, and image BN+2 at an equal distance. Accordingly, while the user continues performing a touching operation on the operation panel 14B, the processing of gathering images continues, and the processing of gathering images stops at a timing at which the touching operation is stopped.

In contrast, when the determination in step S131 is negative, the process proceeds to step S133, and it is determined whether there is an approached image that has not been gathered.

When the determination in step S133 is affirmative, the process returns to step S125. In contrast, when the determination in step S133 is negative, the process returns to step S131.

In contrast, when the determination in step S123 is negative, the process proceeds to step S135, and, as in the processing in step S131, it is determined whether the input operation is cancelled. When the determination in step S135 is negative, the process returns to step S119. In contrast, when the determination in step S135 is affirmative, the process proceeds to step S136, and the controller 38 performs control to cause the specified image to return to the position prior to the movement in step S121 (the original position), and the process returns to step S111.

In contrast, when the determination in step S113 is affirmative, the process proceeds to step S137, and the controller 38 controls the display panel 14A to stop displaying the image list screen 46, and terminates the display control processing program.

In the first exemplary embodiment, the images 50 are arranged in the arrangement direction. However, the first exemplary embodiment is not limited to this case. For example, the images 50 may be arranged in a matrix or may be arranged at random. In these cases, when an approaching operation of causing the specified image to approach another image is performed, the smartphone 10 may perform control to superimpose and display the specified image, the approached image, and images that exist on a straight line connecting the specified image and the approached image and on an extended line of the straight line over one another.

In the first exemplary embodiment, in response to movement of the specified position, the specified image is moved in accordance with the movement of the specified position. However, the first exemplary embodiment is not limited to this case. That is, when the determination in step S119 is affirmative, the processing in step S125 may be performed without performing the processing in steps S121 and S123. In this case, in response to movement of the specified position, an image that approaches the specified image in response to the movement of the specified position serves as an approached image.

Second Exemplary Embodiment

The smartphone 10 according to the above-described first exemplary embodiment performs control to, when a specified image specified by a user approaches another image, superimpose and display the approached image over the specified image. In contrast, the smartphone 10 according to a second exemplary embodiment superimposes and displays, when at least two of specified images specified by a user operation are caused to approach each other, the two specified images which approach each other and an image(s) existing between these specified images over one another.

Since the configuration of the smartphone 10 according to the second exemplary embodiment is the same as or similar to that of the smartphone 10 according to the first exemplary embodiment, a description thereof will be omitted here.

Figure 8:
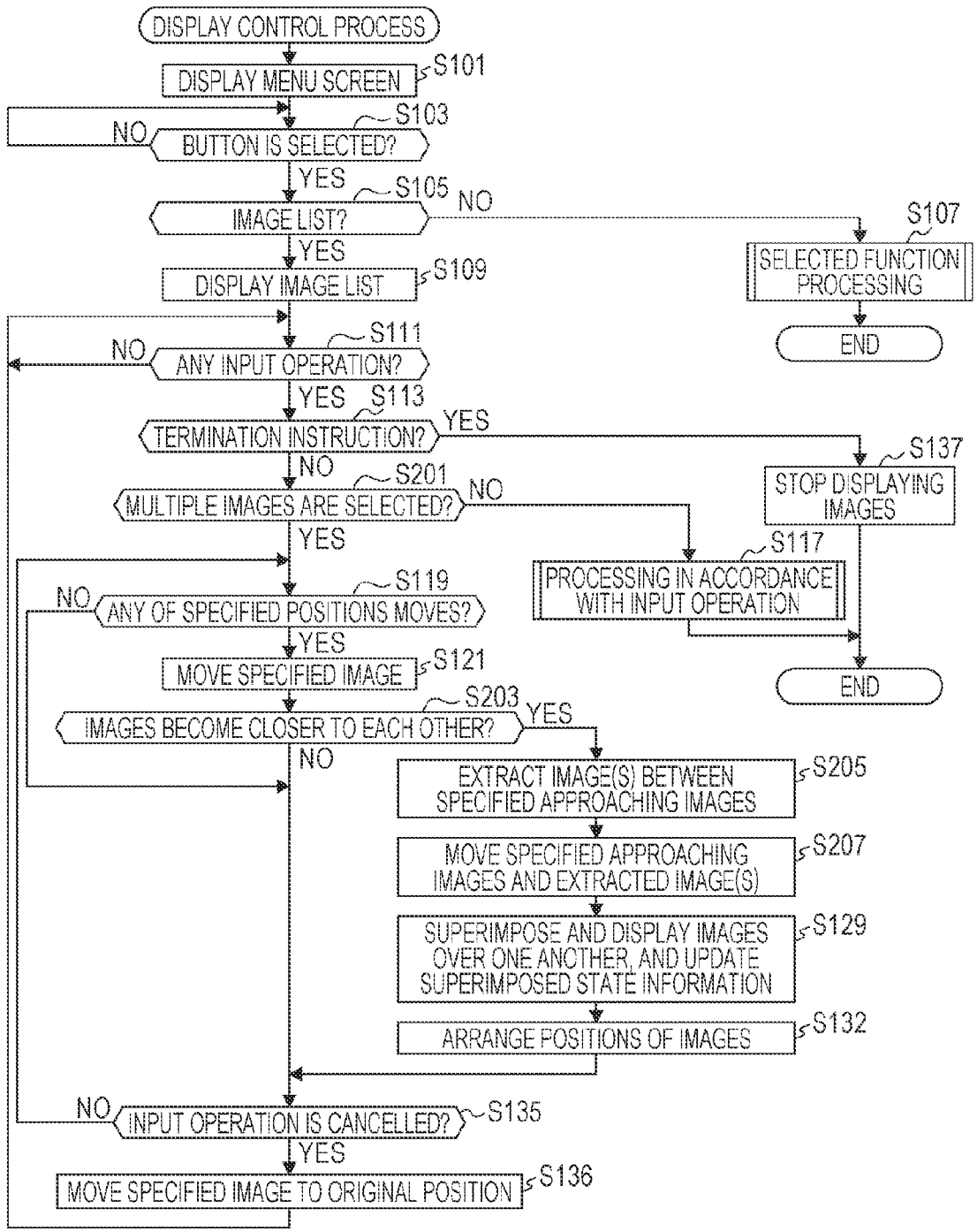
FIG. 8 is a flowchart illustrating the flow of a process of the display control processing program according to a second exemplary embodiment.

Next, referring to FIG. 8, the operation of the smartphone 10 according to the second exemplary embodiment will be described. FIG. 8 is a flowchart illustrating the flow of a process of the display control processing program according to the second exemplary embodiment, which is executed by the controller 38 of the smartphone 10 in response to an execution instruction input via the operation panel 14B or the operation unit 20. This program is stored in advance in a predetermined region of the internal memory 28A.

Firstly, in steps S101 to S113, the same processing as that in steps S101 to S113 of the first exemplary embodiment is performed. When the determination in step S113 is affirmative, the process proceeds to step S137. In step S137, the same processing as that in step S137 of the first exemplary embodiment is performed, and the display control processing program is terminated.

In contrast, when the determination in step S113 is negative, the process proceeds to step S201.

In step S201, it is determined whether the input operation is an input operation of selecting multiple images. When the determination in step S201 is negative, the process proceeds to step S117, processing in accordance with the input operation is executed, and the display control processing program is terminated.

When the determination in step S201 is affirmative, the process proceeds to step S119. In steps S119 and S121, the same processing as that in steps S119 and S121 of the first exemplary embodiment is performed.

Figure 9A:
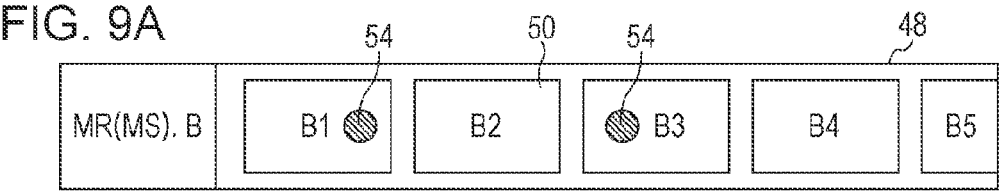
FIG. 9A is a front view illustrating an exemplary configuration of the major portion of the image list screen according to the second exemplary embodiment.

In the second exemplary embodiment, for example, as illustrated in FIG. 9A, it is assumed that two images B1 and B3 are selected. In the second exemplary embodiment, the case in which an input operation of selecting two images is performed will be described. However, the second exemplary embodiment is not limited to this case, and the second exemplary embodiment is applicable to the case in which an input operation of selecting three or more images is performed. Also, each of the selected images will be described as the specified image.

Figure 9B:
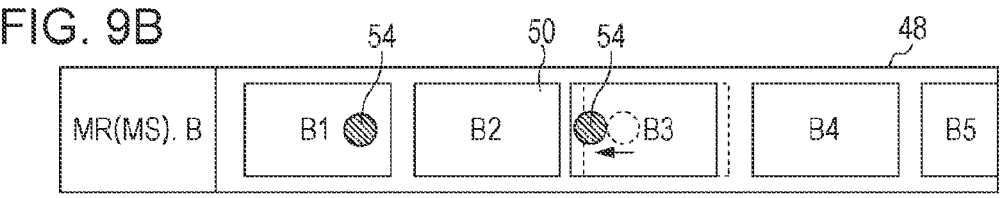
FIG. 9B is a front view illustrating an exemplary configuration of the major portion of the image list screen according to the second exemplary embodiment.

In step S203, it is determined whether at least two images among the specified images become closer to each other. In the second exemplary embodiment, for example, as illustrated in FIG. 9B, it is described that the display position of image B3 moves in a direction toward the position of image B1, and images B1 and B3 become closer to each other. When three or more images are selected in step S201, if at least two images among the selected images become closer to each other, it is determined in step S203 that the images become closer to each other.

When the determination in step S203 is negative, the process proceeds to step S135. In contrast, when the determination in step S203 is affirmative, the process proceeds to step S205, and the controller 38 extracts an image(s) existing between specified images that become closer to each other in response to the movement of the specified position (hereinafter may also be referred to as "specified approaching images"). For example, as illustrated in FIG. 9B, the controller 38 extracts image B2 existing between images B1 and B3, which are the specified approaching images.

Figure 9C:
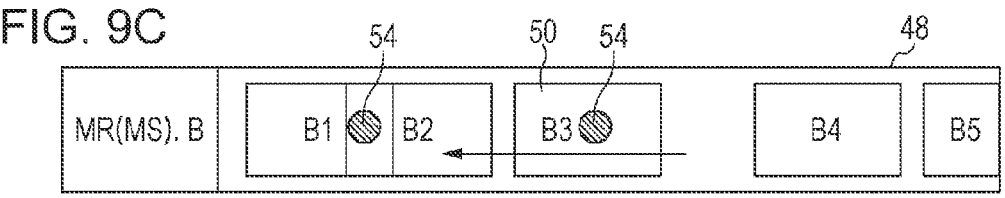
FIG. 9C is a front view illustrating an exemplary configuration of the major portion of the image list screen according to the second exemplary embodiment.
Figure 9D:
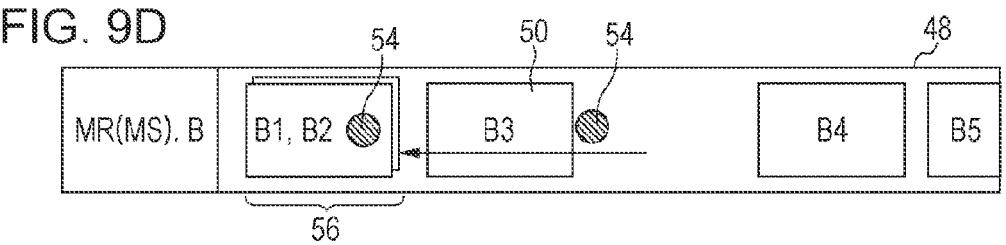
FIG. 9D is a front view illustrating an exemplary configuration of the major portion of the image list screen according to the second exemplary embodiment.
Figure 9E:
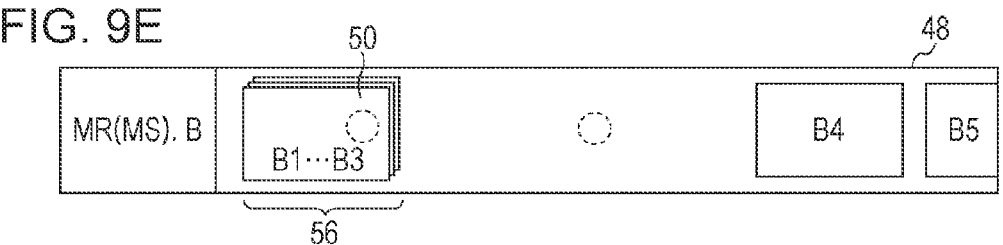
FIG. 9E is a front view illustrating an exemplary configuration of the major portion of the image list screen according to the second exemplary embodiment.

In step S207, the specified approaching images, and the extracted image(s) are moved. At this time, the controller 38 moves the specified approaching images, and the extracted image(s) toward the same predetermined position. For example, as illustrated in FIG. 9C, in order to superimpose images B1 and B3, which are the specified approaching images, and image B2, which is the extracted image, at the same position (the position of image B1 in the second exemplary embodiment), images B2 and B3 are moved toward the position of image B1. As illustrated in FIG. 9D, while moving images B2 and B3 in a direction toward image B1, the controller 38 performs control to superimpose and display images B1 and B2. Also, the controller 38 further moves image B3 in a direction toward images B1 and B2, and, as illustrated in FIG. 9E, the controller 38 performs control to superimpose and display image B3 over images B1 and B2.

In step S129, the same processing as that in step S129 of the first exemplary embodiment is performed. In step S132, the same processing as that in step S132 of the first exemplary embodiment is performed. In steps S135 and S136, the same processing as that in steps S135 and S136 of the first exemplary embodiment is performed.

In the second exemplary embodiment, the example in which two images B1 and B3 are selected has been described. However, the second exemplary embodiment is not limited to this example. That is, when an input operation of selecting three or more images is performed and when these three or more images become closer to each other, the controller 38 performs control to superimpose and display these three or more images over one another. In this case, these three or more images may be superimposed and displayed at the central position of these three or more images. Alternatively, at the position of one of these three or more images, the other images may be superimposed and displayed.

In the second exemplary embodiment, when multiple images are selected, and the images become closer to each other in response to the movement of one of the specified positions, the specified approaching images and an image(s) positioned between the specified images are superimposed and displayed over one another. However, the second exemplary embodiment is not limited to this case. That is, when an image is selected and specified, and when a position in a region different from the specified image is specified and an approaching operation of moving the specified position, which is in the region different from the specified image, closer to the specified image is performed, the specified image and an image(s) positioned between the specified image and the specified position may be superimposed and displayed over one another.

In the second exemplary embodiment, in response to movement of the specified position, the specified image is moved in accordance with the movement of the specified position. However, the second exemplary embodiment is not limited to this case. That is, when the determination in step S119 is affirmative, the processing in step S205 may be performed without performing the processing in steps S121 and S203. In this case, in response to movement of the specified position, an image that approaches the specified image in response to the movement of the specified position serves as an approached image.

When the approached image and the extracted image are moved in step S207, an image existing on the other side of the movement direction of the approached image and the extracted image may be moved in parallel to the approached image and the extracted image.

Further, in the second exemplary embodiment, the specified images and the extracted image(s) are superimposed and displayed over one another in step S129. However, the second exemplary embodiment is not limited to this case. That is, only the specified images may be superimposed and displayed over each other in step S129.

Third Exemplary Embodiment

A third exemplary embodiment is an exemplary embodiment in which the second exemplary embodiment is applied to the case in which, while multiple images are displayed in a matrix, images on multiple rows or columns are specified by a user operation. That is, when multiple specified images specified on multiple rows or columns are caused to approach each other, the smartphone 10 according to the third exemplary embodiment superimposes and displays the approaching images and an image(s) existing, in the order of sequence corresponding to each image, between the approaching images over one another.

Since the configuration of the smartphone 10 according to the third exemplary embodiment is the same as or similar to that of the smartphone 10 according to the first and second exemplary embodiments, a description thereof will be omitted here.

Figure 10A:
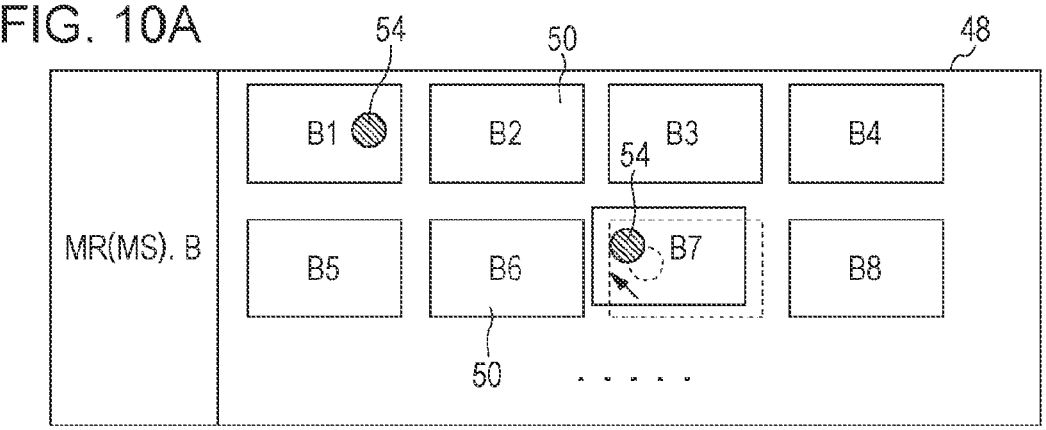
FIG. 10A is a front view illustrating an exemplary configuration of the major portion of the image list screen according to a third exemplary embodiment.

For example, as illustrated in FIG. 10A, when multiple images 50 are arranged in a matrix, the images 50 are arranged in an order indicated by sequence information. For example, images B1 to B4 are arranged on the first row, and images B5 to B8 are arranged on the second row. In the third exemplary embodiment, the controller 38 performs control to arrange the images 50 in an order on a row by row basis and to display the images on the display panel 14A.

In the third exemplary embodiment, the same program as the display control processing program of the second exemplary embodiment is executed. At this time, in the third exemplary embodiment, for example, as illustrated in FIG. 10A, it is described that images B1 and B7 are selected, and image B7 is moved in a direction toward image B1.

In the second exemplary embodiment, images extracted in step S205 are the specified approaching images and an image(s) existing between the specified approaching images. In the third exemplary embodiment, images extracted in step S205 are the specified approaching images and an image(s) existing, in the order of sequence, between the specified approaching images.

Figure 10B:
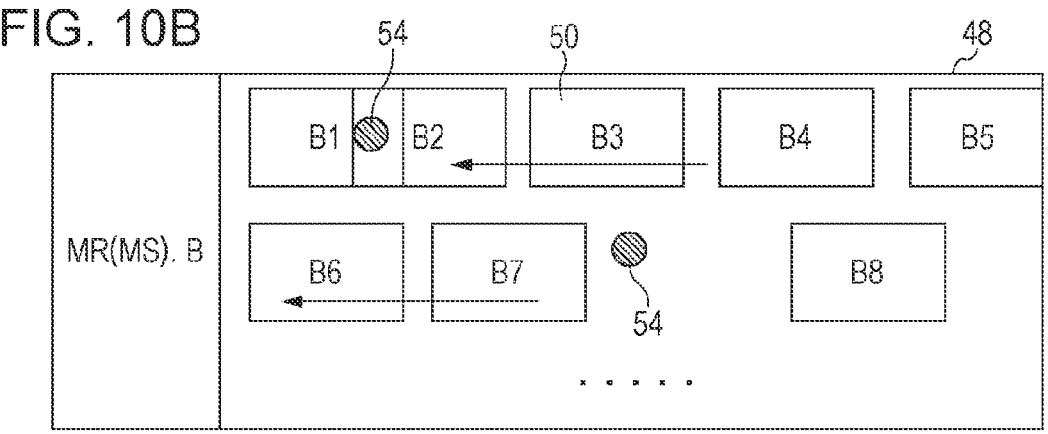
FIG. 10B is a front view illustrating an exemplary configuration of the major portion of the image list screen according to the third exemplary embodiment.

That is, for example, as illustrated in FIG. 10B, when images B1 and B7 are selected by a user operation, images B1 and B7, and images B2 to B6 existing, in the order of sequence, between images B1 to B7 are extracted. In step S207, for example, as illustrated in FIG. 10B, the controller 38 moves images B2 to B7 toward the position at which image B1 exists. At this time, it is preferable that images B2 to B7 be moved in a direction contrary to the arrangement direction and superimposed over image B1.

Figure 10C:
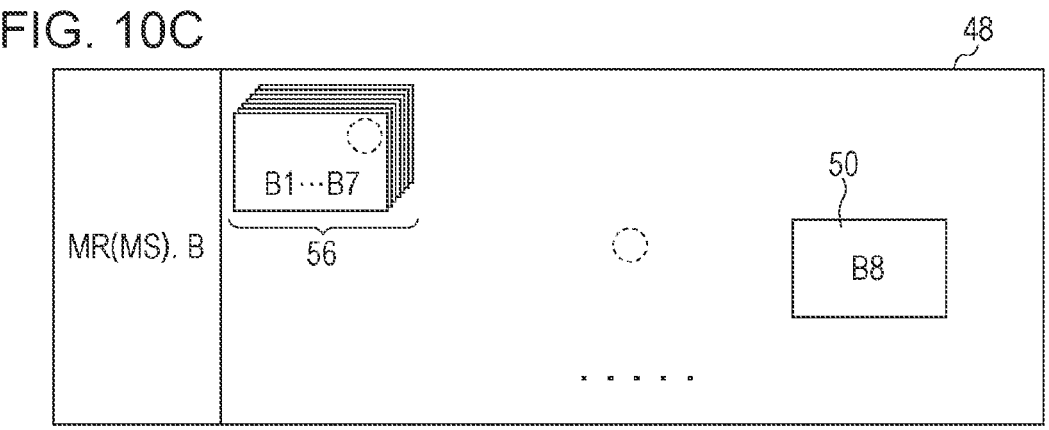
FIG. 10C is a front view illustrating an exemplary configuration of the major portion of the image list screen according to the third exemplary embodiment.

In step S129, for example, as illustrated in FIG. 10C, the controller 38 performs control to display an image bundle 56 including images B1 and B7, which are the specified images, and images B2 to B6, which exist between images B1 and B7, in which images B1 to B7 are superimposed over one another.

In the third exemplary embodiment, an image(s) existing, in the order of sequence indicated by the order-of-sequence information, between two specified images serve as an extracted image(s). However, the third exemplary embodiment is not limited to this case. That is, for example, information indicating the image capturing date may be stored in association with each piece of image information, and an image(s) existing, in the order of image capturing dates, between two specified images may serve as an extracted image(s).

In the third exemplary embodiment, when multiple images are selected, and the images become closer to each other in response to the movement of one of the specified positions, the specified approaching images and an image(s) positioned, in the order of sequence, between the specified images are superimposed and displayed over one another. However, the third exemplary embodiment is not limited to this case. That is, when an image is selected and specified, and when a position in a region different from the specified image is specified and an approaching operation of moving the specified position, which is in the region different from the specified image, closer to the specified image is performed, the specified image and an image(s) positioned between the specified image and the specified position may be superimposed and displayed over one another.

Fourth Exemplary Embodiment

The smartphone 10 according to the second exemplary embodiment performs control to, when at least two of multiple specified images specified by a user operation are caused to approach each other, superimpose and display the approaching images and an image(s) existing between these images over one another. In contrast, a fourth exemplary embodiment is an exemplary embodiment in which the second exemplary embodiment is applied to the case in which, while one of multiple specified images specified by a user operation is continuously selected, another selected image becomes unselected, and then yet another image is again selected. That is, while at least one of multiple specified images is being selected, the smartphone 10 according to the fourth exemplary embodiment superimposes and displays a specified image caused to approach the selected image, and an image(s) existing between the specified image and the selected image over one another.

Since the configuration of the smartphone 10 according to the fourth exemplary embodiment is the same as or similar to that of the smartphone 10 according to the first to third exemplary embodiments, a description thereof will be omitted here.

Figure 11:
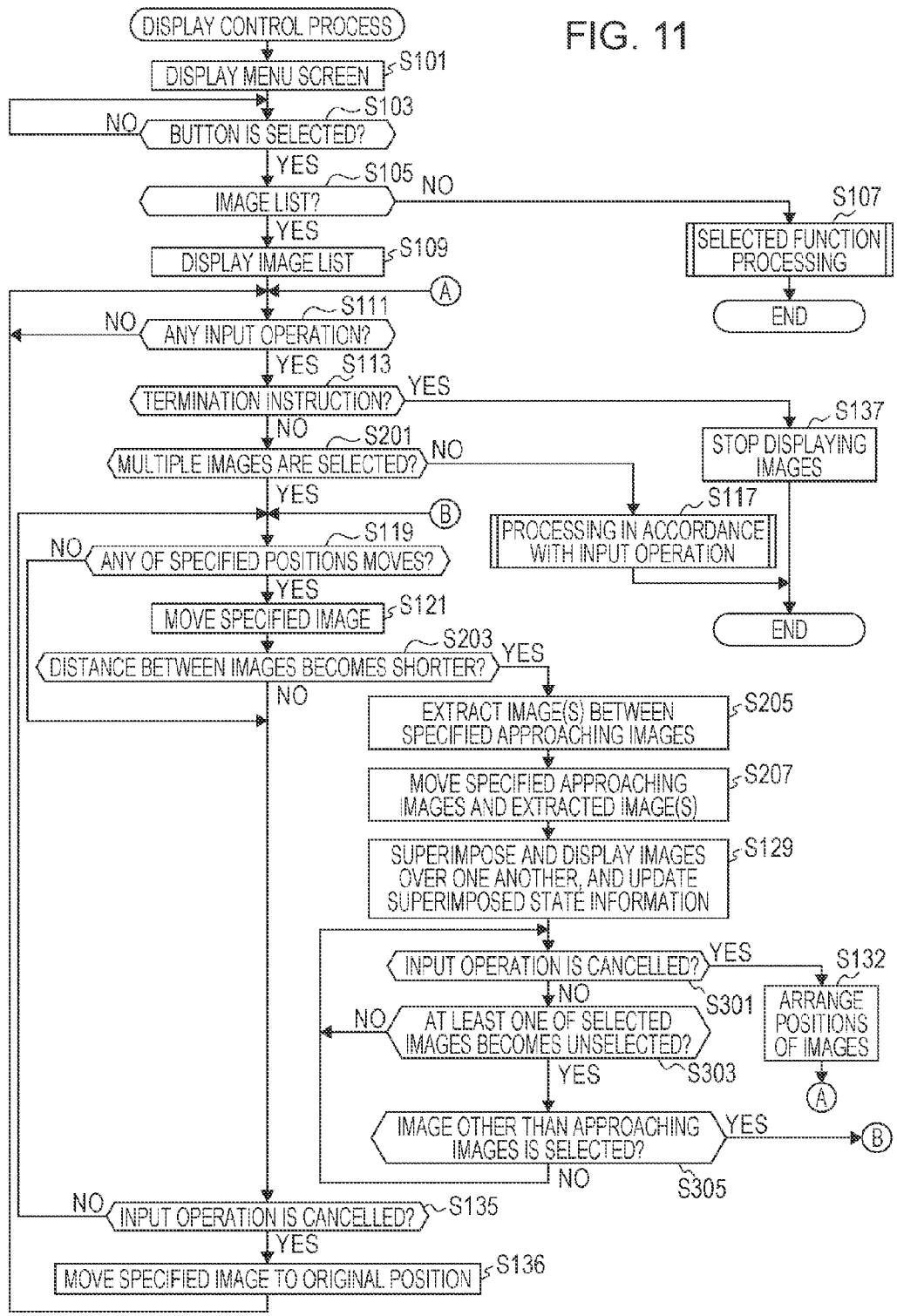
FIG. 11 is a flowchart illustrating the flow of a process of the display control processing program according to a fourth exemplary embodiment.

Next, referring to FIG. 11, the operation of the smartphone 10 according to the fourth exemplary embodiment will be described. FIG. 11 is a flowchart illustrating the flow of a process of the display control processing program according to the fourth exemplary embodiment, which is executed by the controller 38 of the smartphone 10 in response to an execution instruction input via the operation panel 14B or the operation unit 20. This program is stored in advance in a predetermined region of the internal memory 28A.

Firstly, in steps S101 to S129, the same processing as that in steps S101 to S129 of the first exemplary embodiment is performed.

Figure 12A:
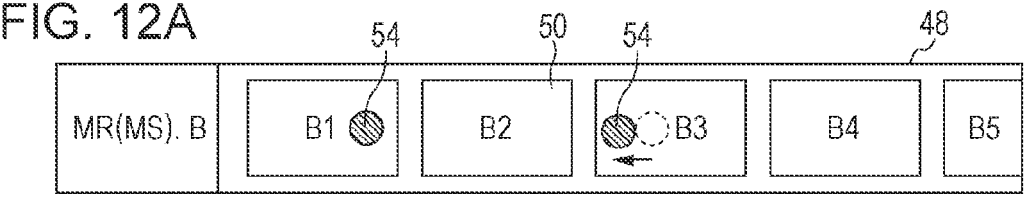
FIG. 12A is a front view illustrating an exemplary configuration of the major portion of the image list screen according to the fourth exemplary embodiment.
Figure 12B:
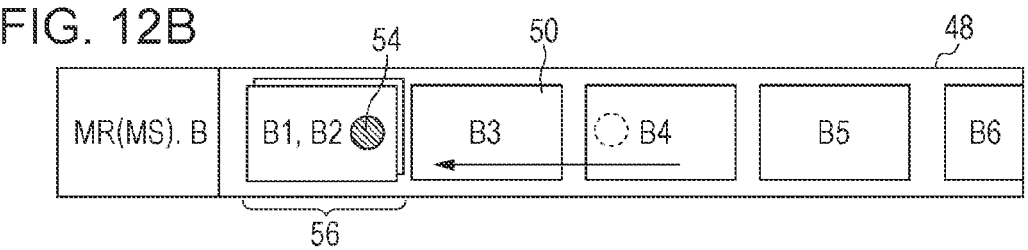
FIG. 12B is a front view illustrating an exemplary configuration of the major portion of the image list screen according to the fourth exemplary embodiment.

For example, as illustrated in FIG. 12A, it is described that images B1 and B3 are selected, and image B3 is moved in a direction toward image B1. When image B3 moves in a direction toward image B1, the controller 38 performs control to superimpose and display images B1 to B3 over one another, as illustrated in FIG. 12B. At this time, in response to the movement of images B2 and B3, an image positioned on the opposite side of the movement direction of images B2 and B3 (such as image B4 or the like) is moved in a direction toward image B1. In the fourth exemplary embodiment, image B4 closest to images B1 to B3 is moved to and displayed at a position at which image B3 has been displayed. However, the fourth exemplary embodiment is not limited to this case. That is, any of the images positioned on the opposite side of images B1 to B3 may be moved.

In step S301, it is determined whether the input operation is cancelled. At this time, the controller 38 determines that the input operation is cancelled when all the specified images determined to be selected in step S201 become unspecified. When the determination in step S301 is affirmative, the process proceeds to step S132, and then returns to step S111.

In contrast, when the determination in step S301 is negative, the process proceeds to step S303, and it is determined whether at least one selected image becomes unselected. At this time, the controller 38 determines that at least one selected image becomes unselected when any of the specified images determined to be selected in step S201 becomes unspecified.

When the determination in step S303 is negative, the process returns to step S301. In contrast, when the determination in step S303 is affirmative, the process proceeds to step S305, and it is determined whether any of images that have not been selected at the present stage is selected.

Figure 12C:
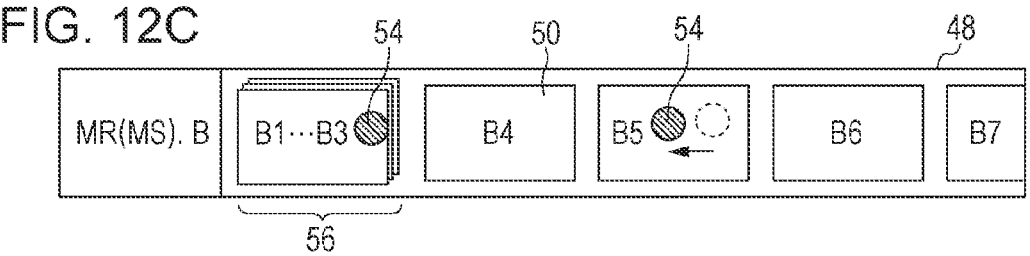
FIG. 12C is a front view illustrating an exemplary configuration of the major portion of the image list screen according to the fourth exemplary embodiment.
Figure 12D:
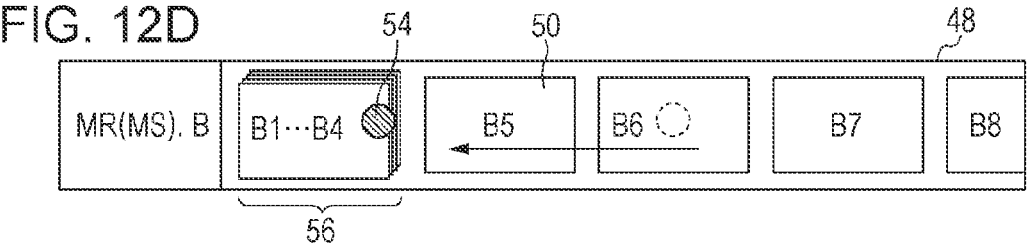
FIG. 12D is a front view illustrating an exemplary configuration of the major portion of the image list screen according to the fourth exemplary embodiment.
Figure 12E:
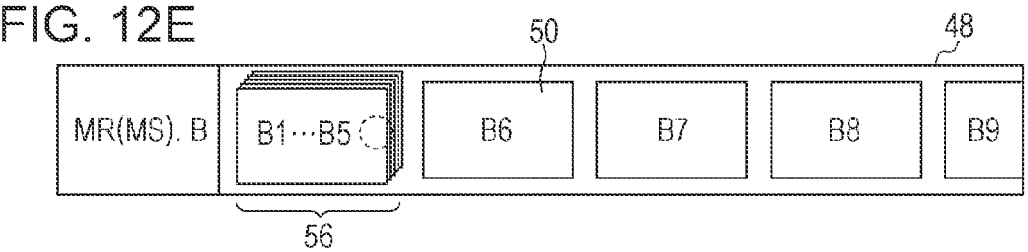
FIG. 12E is a front view illustrating an exemplary configuration of the major portion of the image list screen according to the fourth exemplary embodiment.

For example, as illustrated in FIG. 12B, it is assumed that, while image B1 is continuously selected, selected image B3 becomes unselected, as illustrated in FIG. 12C, image B5 is further selected, and image B5 moves in a direction toward an image bundle 56 including images B1 to B3. In this case, as illustrated in FIG. 12D, the controller 38 moves the selected image B5, and image B4 existing between the image bundle 56 and image B5, in a direction toward the image bundle 56, and, as illustrated in FIG. 12E, the controller 38 superimposes and displays images B1 to B5 over one another. While continuously selecting at least one image, the user repeatedly selects and unselects another image, thereby superimposing and displaying images including those not displayed on the display panel 14A over one another, which enables the user to check the images one by one.

In contrast, when the determination in step S305 is negative, the process returns to step S301. When the determination in step S305 is affirmative, the process returns to step S119.

In the fourth exemplary embodiment, images are gathered at a timing at which the specified position moves in step S119. However, the fourth exemplary embodiment is not limited to this case. That is, prior to the processing in step S207, the processing in step S303 may be performed to determine whether at least one of the selected images becomes unselected. When it is determined that at least one of the selected images becomes unselected, the process may proceed to the processing in step S207. In this case, when the determination in step S301 is negative, the process proceeds to step S305 without performing the processing in step S303.

Fifth Exemplary Embodiment

The smartphone 10 according to the first exemplary embodiment performs control to, when a specified image specified by a user operation approaches another image, superimpose and display the approached image over the specified image. In contrast, the smartphone 10 according to a fifth exemplary embodiment superimposes and displays, when at least two of multiple specified images specified by a long press performed by a user operation approach each other, the specified approaching images and an image(s) existing between these specified images over one another.

Since the configuration of the smartphone 10 according to the fifth exemplary embodiment is the same as or similar to that of the smartphone 10 according to the first exemplary embodiment, a description thereof will be omitted here.

Figure 13:
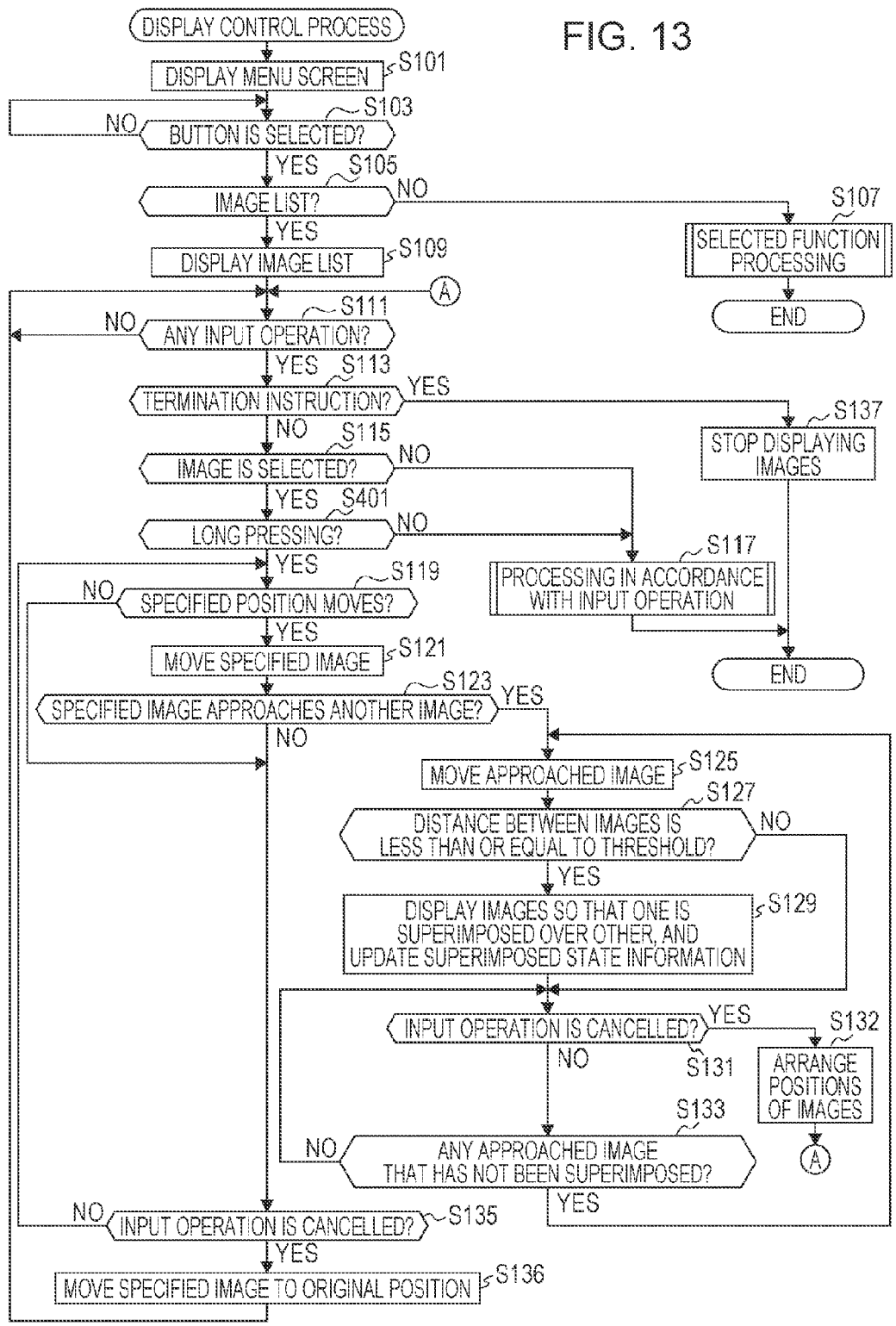
FIG. 13 is a flowchart illustrating the flow of a process of the display control processing program according to a fifth exemplary embodiment.

Next, referring to FIG. 13, the operation of the smartphone 10 according to the fifth exemplary embodiment will be described. FIG. 13 is a flowchart illustrating the flow of a process of the display control processing program, which is executed by the controller 38 of the smartphone 10 in response to an execution instruction input via the operation panel 14B or the operation unit 20. This program is stored in advance in a predetermined region of the internal memory 28A.

Firstly, in steps S101 to S117, the same processing as that in steps S101 to S117 of the first exemplary embodiment is performed.

In step S401, it is determined whether a long press is performed while an image is being selected. At this time, it is determined that a long press is performed when a specified position is not changed and an image is continuously selected for a predetermined time (such as 2 seconds) or longer. When the determination in step S401 is negative, the process proceeds to step S117, the same processing as that in step S117 of the first exemplary embodiment is performed, and the display control processing program is terminated.

In contrast, when the determination in step S401 is affirmative, the process proceeds to step S119. In steps S119 to S137, the same processing as that in steps S119 to S137 of the first exemplary embodiment is performed.

Sixth Exemplary Embodiment

The smartphone 10 according to the first to fifth exemplary embodiments performs control to, when at least two of multiple images are caused by a user operation to approach each other, superimpose and display the approached image over the specified image. In contrast, when an image bundle 56 is specified by a user operation, the smartphone 10 according to a sixth exemplary embodiment displays images included in the specified image bundle 56 or cancels the superimposed display of the image bundle 56.

Since the configuration of the smartphone 10 according to the sixth exemplary embodiment is the same as or similar to that of the smartphone 10 according to the first to fifth exemplary embodiments, a description thereof will be omitted here.

Figure 14:
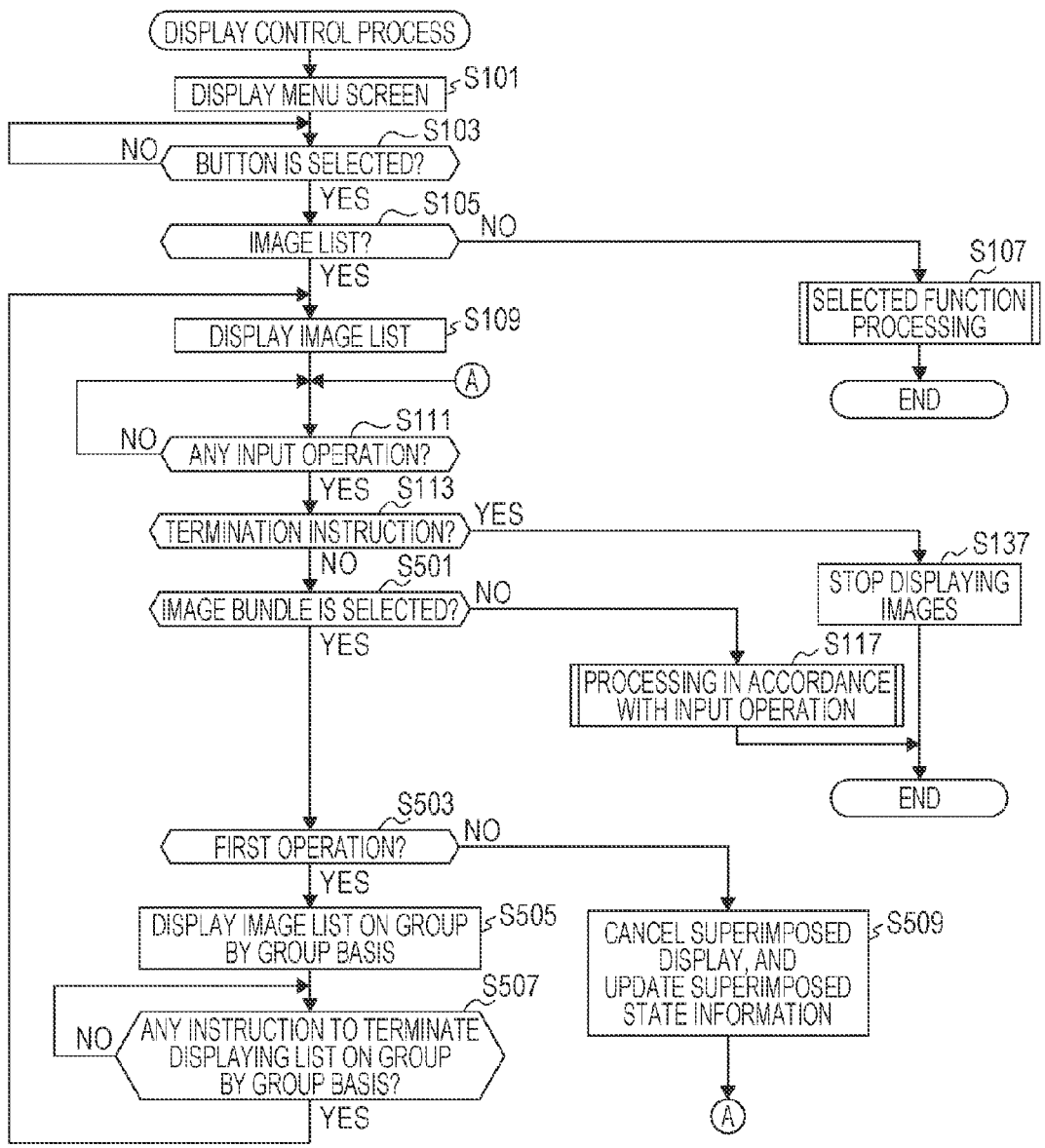
FIG. 14 is a flowchart illustrating the flow of a process of the display control processing program according to a sixth exemplary embodiment.

Next, referring to FIG. 14, the operation of the smartphone 10 according to the sixth exemplary embodiment will be described. FIG. 14 is a flowchart illustrating the flow of a process of the display control processing program, which is executed by the controller 38 of the smartphone 10 in response to an execution instruction input via the operation panel 14B or the operation unit 20. This program is stored in advance in a predetermined region of the internal memory 28A.

Firstly, in steps S101 to S113, the same processing as that in steps S101 to S113 of the first exemplary embodiment is performed.

When the determination in step S113 is negative, the process proceeds to step S501, and it is determined whether an image bundle 56 is selected. At this time, it is determined that an image bundle 56 is selected when the image bundle 56 is specified via the operation panel 14B. When the determination in step S501 is negative, the process proceeds to step S117.

In contrast, when the determination in step S501 is affirmative, the process proceeds to step S503, and it is determined whether the operation of selecting the image bundle 56 is a predetermined first operation. The first operation is an operation of continuously touching a position corresponding to the image bundle 56 on the operation panel 14B for, for example, a predetermined threshold time or shorter.

When the determination in step S503 is affirmative, the process proceeds to step S505, and a list of images included in the selected image bundle 56 is displayed.

Figure 15A:
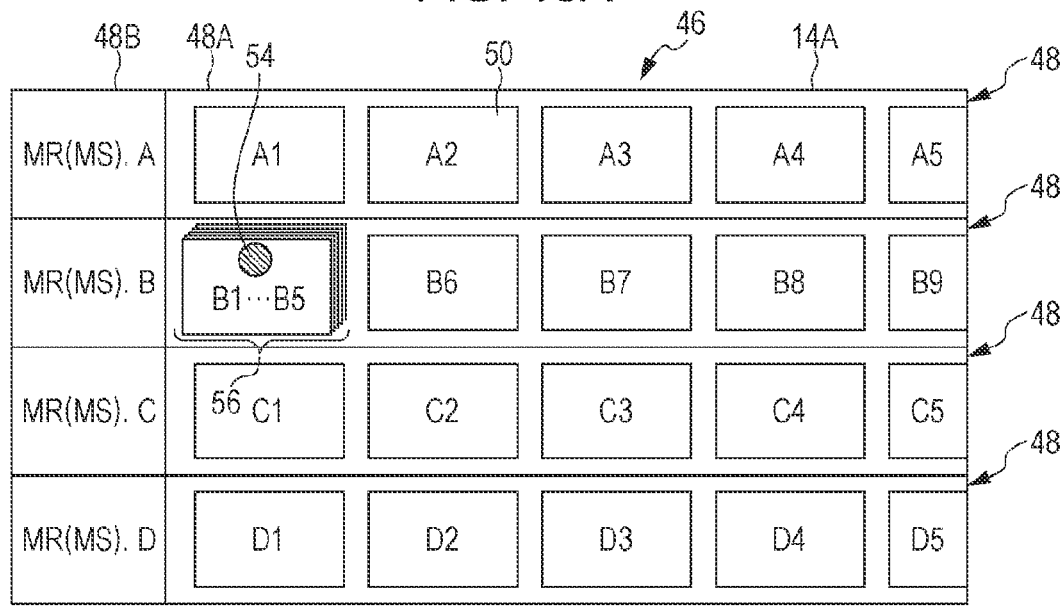
FIG. 15A is a front view illustrating an exemplary configuration of the image list screen according to the sixth exemplary embodiment.
Figure 15B:
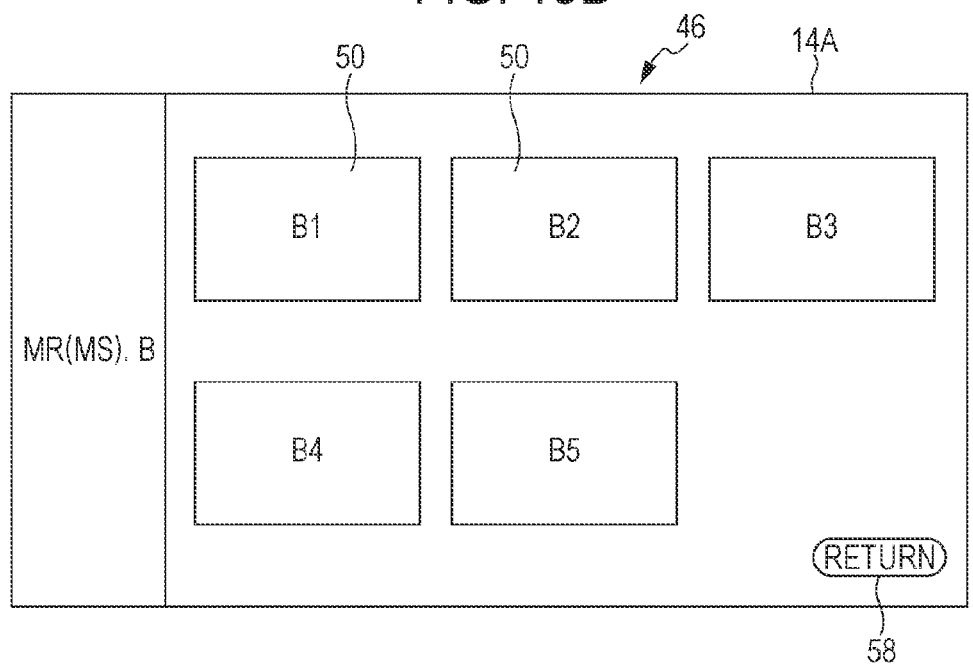
FIG. 15B is a front view illustrating an exemplary configuration of the image list screen according to the sixth exemplary embodiment.

For example, as illustrated in FIG. 15A, it is assumed that an image bundle 56, including images B1 to B5 superimposed and displayed over one another, is selected by a user operation. In this case, as illustrated in FIG. 15B, images B1 to B5 included in the image bundle 56, and a return button 58 for returning to the image list screen 46 are displayed in the display region of the display panel 14A.

In step S507, it is determined whether the return button 58 is selected, thereby determining whether an instruction is given to terminate displaying the list on a group by group basis. The controller 38 enters standby until this termination instruction is given. When the determination in step S507 is affirmative, the process returns to step S109.

In contrast, when the determination in step S503 is negative, the process proceeds to step S509, and the controller 38 performs control to cancel the superimposed display of the selected image bundle 56 and to individually display images included in the image bundle 56, which have been superimposed and displayed over one another. In step S509, the controller 38 updates the superimposed state information so as to cancel the superimposed display of the images included in the image bundle 56, and the process returns to step S111.

Figure 16A:
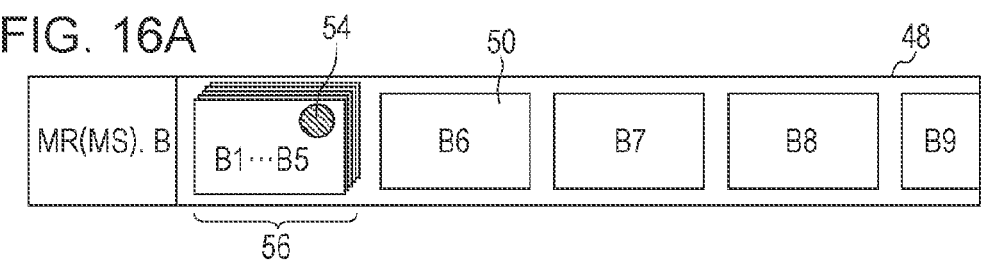
FIG. 16A is a front view illustrating an exemplary configuration of the major portion of the image list screen according to the sixth exemplary embodiment.
Figure 16B:
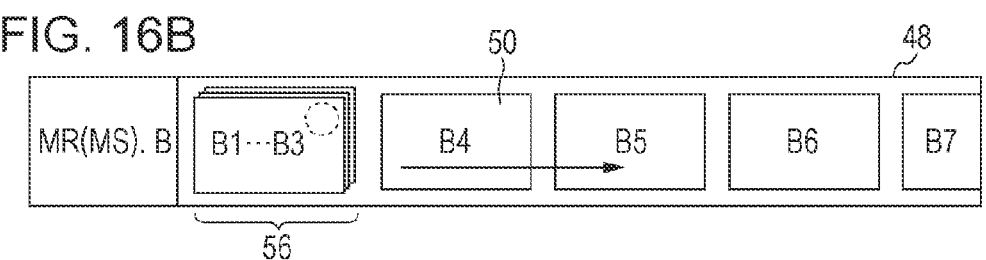
FIG. 16B is a front view illustrating an exemplary configuration of the major portion of the image list screen according to the sixth exemplary embodiment.
Figure 16C:
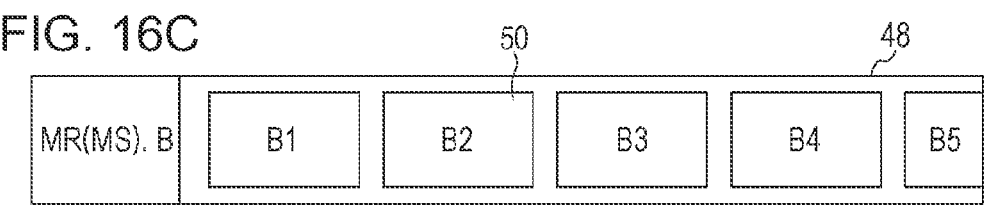
FIG. 16C is a front view illustrating an exemplary configuration of the major portion of the image list screen according to the sixth exemplary embodiment.

For example, as illustrated in FIG. 16A, it is assumed that an image bundle 56 including images B1 to B5, which are superimposed and displayed over one another, is selected, and a double touch operation of consecutively touching twice the same position of the operation panel 14B is performed. In this case, as illustrated in FIG. 16B, the controller 38 performs control to cancel the superimposed display in an order of image B5, image B4, and so forth, and, as illustrated in FIG. 16C, to individually display images B1 to B5 on the display panel 14A.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display control apparatus comprising:
a display comprising a touch panel, the display configured to display at least a first image and a second image;
a controller configured to superimpose the first image over the second image in response to a gesture operation being performed via the touch panel, the gesture operation causing the first image to move from a first position towards the second image while the second image remains at a second position on the display,
wherein, when a third image exists between the first image and the second image, the controller controls to superimpose and display the first image, the third image and the second image by moving the first image and the third image to the second position of the second image,
wherein the controller is further configured to display the superimposed first and second images on the display in response to a distance between the first and second images being less than or equal to a predetermined threshold, and
wherein the controller is further configured to display the superimposed third and second images on the display in response to a distance between the third and second images being less than or equal to a predetermined threshold.

2. The display control apparatus according to claim 1, wherein the gesture operation comprises a touch input including a first touch at the second position of the second image on the touch panel and a second touch on the touch panel, the second touch moving toward the first touch at the second position.

3. The display control apparatus according to claim 1, wherein, prior to the gesture operation, in response to a long press operation of continuously touching at least one of the first and the second image for a predetermined time or longer, the first image and the second image are superimposed and displayed over each other.

4. The display control apparatus according to claim 1, wherein, in response to gesture operation which is continuously performed, the first image, the third image and the second image are superimposed over each other in a period in which the gesture operation is continuously performed.

5. The display control apparatus according to claim 1, wherein, while the first, the third and the second images are superimposed and displayed over each other, in response to a touching operation, performed via the touch panel, of touching the superimposed first, third and second images, the first image, the third image and the second image which are superimposed and displayed over each other are individually displayed without being superimposed over each other.

6. A non-transitory computer readable medium storing a program causing a computer to execute a process, the process comprising:
  displaying at least a first image and a second image;
  superimposing the first image over the second image in response to a gesture operation being performed via a touch panel, the gesture operation being an operation that causes the first image to move from a first position towards the second image while the second image remains at a second position on the display; and
  displaying the superimposed first and second images on the display in response to a distance between the first and second images being less than or equal to a predetermined threshold,
  wherein, when a third image exists between the first image and the second image, the superimposing moves the first image and the third image to the second position of the second image, and in response to a distance between the third and second images being less than or equal to a predetermined threshold, the superimposing superimposes the third and second images and the displaying displays the superimposed third and second images on the display.

7. A display control method comprising:
  displaying at least a first image and a second image;
  superimposing the first image over the second image in response to a gesture operation being performed via a touch panel, the gesture operation being an operation that causes the first image to move from a first position towards the second image while the second image remains at a second position on the display; and
  displaying the superimposed first and second images on the display in response to a distance between the first and second images being less than or equal to a predetermined threshold,
  wherein, when a third image exists between the first image and the second image, the superimposing moves the first image and the third image to the second position of the second image, and in response to a distance between the third and second images being less than or equal to a predetermined threshold, the superimposing superimposes the third and second images and the displaying displays the superimposed third and second images on the display.

* * * * *